United States Patent [19]
Lee

[11] Patent Number: 5,934,098
[45] Date of Patent: Aug. 10, 1999

[54] REFRIGERATOR HAVING A CABINET MANUFACTURED BY A BLOW-MOLDING PROCESS

[75] Inventor: Chang-Hoon Lee, Seoul, Rep. of Korea

[73] Assignee: Daewoo Electronics Co., Ltd., Seoul, Rep. of Korea

[21] Appl. No.: 09/116,575

[22] Filed: Jul. 16, 1998

[30] Foreign Application Priority Data

Jul. 30, 1997 [KR] Rep. of Korea .................. 97-36225

[51] Int. Cl.⁶ ....................... F25D 11/00; A47B 96/04
[52] U.S. Cl. ....................... 62/440; 62/298; 312/401; 312/406
[58] Field of Search .................. 312/116, 401, 312/406; 62/298, 440

[56] References Cited

U.S. PATENT DOCUMENTS

| | | | |
|---|---|---|---|
| 3,732,646 | 5/1973 | Horvay | 49/487 |
| 4,006,947 | 2/1977 | Haag | 312/214 |
| 4,583,796 | 4/1986 | Nakajima | 312/214 |
| 5,306,082 | 4/1994 | Karlin et al. | |
| 5,476,318 | 12/1995 | Yingst | 312/405 |
| 5,629,745 | 5/1997 | Naito et al. | |
| 5,716,581 | 2/1998 | Tirrell | 264/545 |

*Primary Examiner*—Henry Bennett
*Assistant Examiner*—Melvin Jones
*Attorney, Agent, or Firm*—Pillsbury Madison & Sutro LLP

[57] ABSTRACT

A refrigerator made by a blow-molding process. The refrigerator has a cabinet made by a blow molding and formed at an upper front portion thereof with a first two-stepped groove which surrounds an inlet of a freezing chamber and formed at a lower front portion thereof with a second two-stepped groove which surrounds an inlet of a refrigerating chamber, an upper door formed at a rear periphery portion thereof, which faces the refrigerating chamber, with a first recess corresponding to the first two-stepped groove, a lower door formed at a rear periphery portion thereof, which faces the freezing chamber, with a second recess corresponding to the second two-stepped groove, an upper gasket received in the first recess and having a first magnet therein, a lower gasket received in the second recess and having a second magnet therein, a first coupling member for fixing the upper door to a front surface of the cabinet when the freezing chamber is closed by the upper door, and a second coupling member for fixing the lower door to the front surface of the cabinet when the refrigerating chamber is closed by the lower door. The refrigerator is light in weight and, since the cabinet is made by a blow molding process, the manufacturing time and the assembling steps are reduced.

7 Claims, 5 Drawing Sheets

REFRIGERATOR HAVING A CABINET MANUFACTURED BY A BLOW-MOLDING PROCESS

BACKGROUND OF THE INVENTION

1. Field of the Invention

The present invention relates to a refrigerator, and more particularly to a refrigerator having a cabinet manufactured by a blow-molding process.

2. Description of the Prior Art

Generally, a refrigerator is an apparatus for storing various foodstuffs in either a frozen or a refrigerated condition to extend the freshness of the foodstuffs for a long time. Such a refrigerator includes a compressor which circulates a refrigerant by compressing the refrigerant, a condenser for condensing the refrigerant into a liquid phase, and an evaporator for generating a chilled air by evaporating the liquid phase refrigerant.

The refrigerator has a freezing chamber for storing frozen foods such as meats or an ice cream, and a refrigerating chamber for storing foods at a relatively lower temperature. The chilled air generated by the evaporator is blown into the refrigerating and freezing chambers by a fan.

FIG. 1 shows a conventional refrigerator 100. As shown in FIG. 1, refrigerator 100 has a cabinet 110 including a refrigerating chamber 120 which is separated from a freezing chamber 130 by a partition wall 125. Refrigerating chamber 120 is opened/closed by a lower door 140 and freezing chamber 130 is opened/closed by an upper door 150. An evaporator (not shown) is installed at a rear portion of freezing chamber 130 and a compressor (not shown) is installed below refrigerating chamber 120. A condenser (not shown) is disposed between the evaporator and the compressor.

Upper and lower doors 150 and 140 are hinged to one side of a front portion of cabinet 110. In addition, an upper groove 152 into which an upper gasket 170 is installed is formed at an inner periphery surface of upper door 150, and a lower groove 142 into which a lower gasket 160 is installed is formed at an inner periphery surface of lower door 140.

Referring to FIG. 2, cabinet 110 includes an inner cabinet 112 and an outer cabinet 114 which is coupled to inner cabinet 112. An insulation material 116, such as urethane, is filled between inner and outer cabinets 112 and 114. Reference number 162 is a magnet. Magnet 162 is accommodated in upper and lower gaskets 170 and 160, respectively, and attracts the front portion of cabinet 110 when refrigerating chamber 120 or freezing chamber 130 is closed thereby preventing air from flowing into refrigerating chamber 120 or freezing chamber 130.

However, in conventional refrigerator 100, inner and outer cabinets 112 and 114 are coupled to each other after they are separately manufactured, so complicated assembling steps are required for manufacturing cabinet 110. In addition, since refrigerator 100 is manufactured by a metal, it is heavy in weight.

Recently, in order to reduce the weight of the refrigerator and to simplify the assembling steps thereof, the cabinet or door of the refrigerator is manufactured by a blow-molding process. The blow-molding process is a manufacturing technique for integrally molding some elements such as the inner and outer cabinets or the door of the refrigerator by using a plastic material or a synthetic resin.

U.S. Pat. No. 5,306,082 issued to Karlin and U.S. Pat. No. 5,629,745 issued to Ryoji Naito disclose a door for a refrigerator and a cabinet for a television set which are manufactured by the blow-molding process, respectively.

However, if the cabinet of the refrigerator is manufactured by the blow-molding by using a non-magnetic substance, the gasket having a magnet therein cannot adhere to the cabinet. Accordingly, it has been necessary to develop a technique which can make the gasket of the door adhere to the cabinet manufactured by the blow-molding process.

SUMMARY OF THE INVENTION

The present invention has been made to overcome the above described problem of the prior art. Accordingly, it is an object of the present invention to provide a refrigerator in which a cabinet is manufactured by a blow-molding process and a gasket installed in a door can be detachably attached to the cabinet.

To accomplish the object of the present invention, there is provided a refrigerator comprising:

a cabinet being manufactured by a blow molding process and having a refrigerating chamber and a freezing chamber which is disposed above the refrigerating chamber, the cabinet being formed at an upper front portion thereof with a first two-stepped groove which surrounds an inlet of the freezing chamber and being formed at a lower front portion thereof with a second two-stepped groove which surrounds an inlet of the refrigerating chamber;

an upper door for opening/closing the freezing chamber, the upper door being formed at a rear periphery portion thereof, which faces the freezing chamber, with a first recess corresponding to the first two-stepped groove;

a lower door for opening/closing the refrigerating chamber, the lower door being formed at a rear periphery portion thereof, which faces the refrigerating chamber, with a second recess corresponding to the second two-stepped groove;

an upper gasket received in the first recess and having a first magnet therein;

a lower gasket received in the second recess and having a second magnet therein;

a first means for fixing the upper door to a front surface of the cabinet when the freezing chamber is closed by the upper door; and a second means for fixing the lower door to the front surface of the cabinet when the refrigerating chamber is closed by the lower door.

According to the preferred embodiment of the present invention, each first two-stepped groove and second two-stepped groove includes a first groove formed at the front surface of the cabinet and a second groove which extends towards an inner portion of the cabinet from a bottom of the first groove. The first groove has a rectangular sectional shape and the second groove has a reverse frusto-conical shape, respectively, when viewed from a top.

The first means includes a first coupling member which is accommodated in the first two-stepped groove. The first coupling member includes a rectangular frame having a shape corresponding to the first groove so as to be received in the first groove, a pair of fixing members which are formed along a periphery of a rear surface of the rectangular frame and are accommodated in the second groove of the first two-stepped groove, and a metal piece which is accommodated in the rectangular frame and is attracted by the magnet.

The second means includes a second coupling member which is accommodated in the second two-stepped groove.

The second coupling member includes a rectangular frame having a shape corresponding to the second groove so as to be received in the second groove, a pair of fixing members which are formed along a periphery of a rear surface of the rectangular frame and are accommodated in the second groove of the second two-stepped groove, and a metal piece which is accommodated in the rectangular frame and is attracted by the magnet.

The cabinet is manufactured by the blow-molding process in such a manner that first and second two-stepped grooves can be formed at the front periphery thereof.

Then, first and second coupling members manufactured by the compression molding are received in first and second two-stepped grooves, respectively. Next, upper and lower gaskets are press-fitted into first and second recesses formed in upper and lower doors, respectively.

As a result, when the freezing/refrigerating chamber is closed, the upper/lower gasket mounted in the upper/lower door is attached to the first/second coupling member thereby preventing the air from flowing into the freezing/refrigerating chamber.

As described above, the refrigerator according to the present invention has a cabinet made of synthetic resin or plastic, so the refrigerator has a simple structure and has a light weight. In addition, since the cabinet can be manufactured by a blow-molding process, the manufacturing time and the assembling steps for the cabinet can be reduced.

BRIEF DESCRIPTION OF THE DRAWINGS

The above object and other advantages of the present invention will become more apparent by describing in detail a preferred embodiment thereof with reference to the attached drawings in which.

DETAILED DESCRIPTION OF THE INVENTION

Hereinafter, a preferred embodiment of the present invention will be explained in detail with reference to the accompanying drawings.

Figure 1:
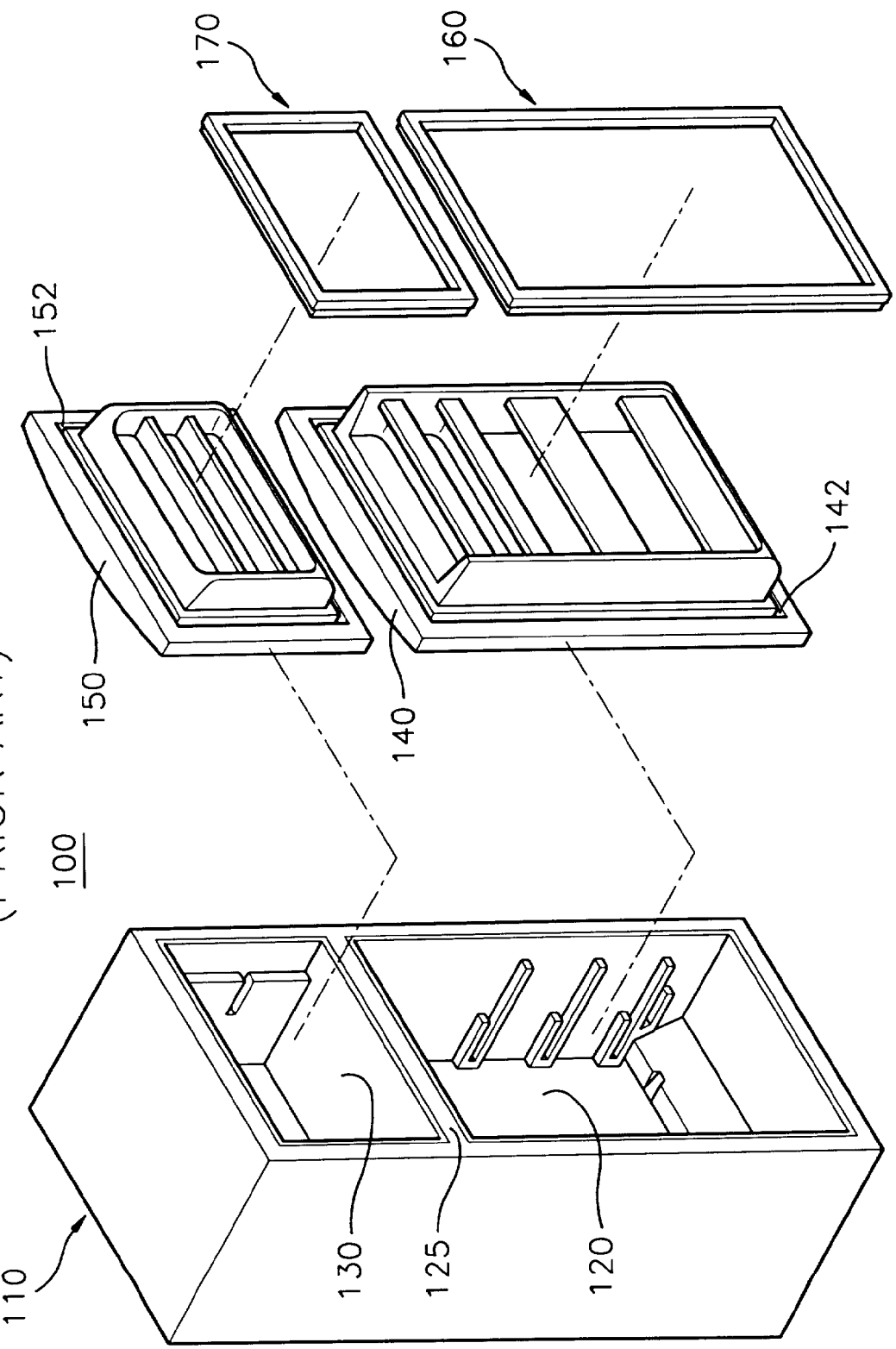
FIG. 1 is an exploded perspective view showing the structure of a conventional refrigerator.
Figure 2:
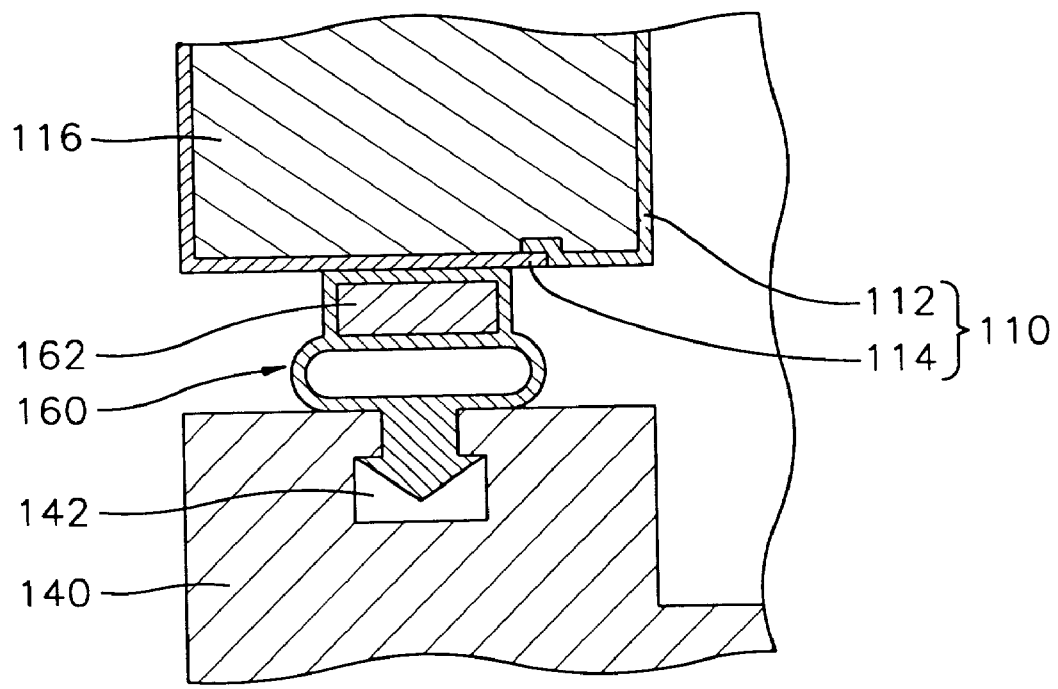
FIG. 2 is a partially sectional plan view showing a door attached to a cabinet.
Figure 3:
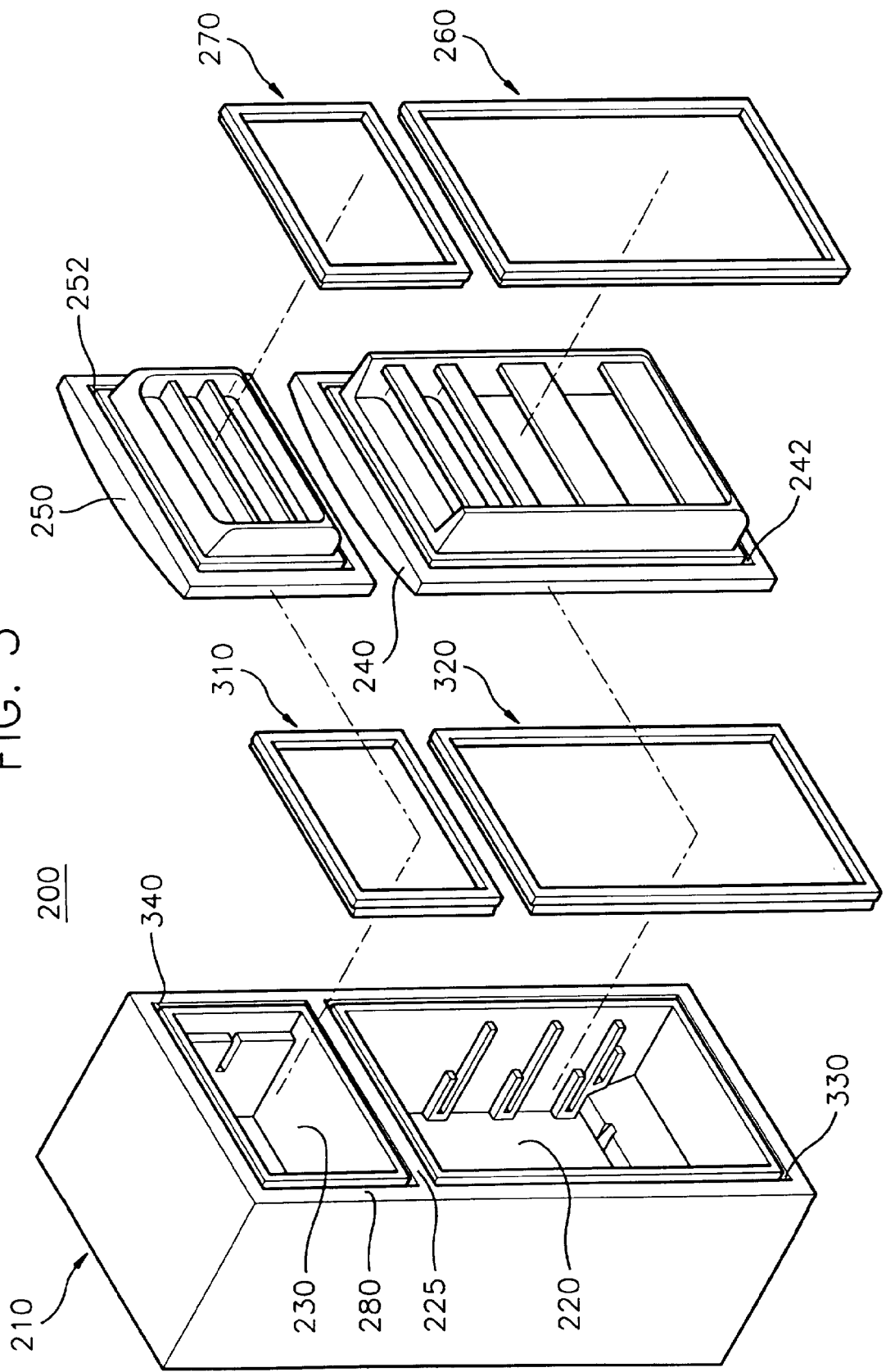
FIG. 3 is an exploded perspective view showing the structure of a refrigerator according to one embodiment of the present invention.

FIG. 3 shows a refrigerator 200 according to the present invention. As shown in FIG. 3, refrigerator 200 of the present invention has a cabinet 210 manufactured by a blow-molding process. By means of the blow-molding process, cabinet 210 can be manufactured by using synthetic resin or plastic, so cabinet 210 is light in weight and the manufacturing time and the assembling steps are reduced.

Cabinet 210 is formed with a refrigerating chamber 220 and a freezing chamber 230 which is separated from refrigerating chamber 220 by a partition 225. Refrigerating chamber 220 is opened/closed by a lower door 240 and freezing chamber 230 is opened/closed by an upper door 250. An evaporator (not shown) is installed at a rear portion of freezing chamber 230 and a compressor (not shown) is installed below refrigerating chamber 220. A condenser (not shown) is disposed between the evaporator and the compressor.

In order to open/close refrigerating and freezing chambers 220 and 230, upper and lower doors 250 and 240 are hinged to one side of a front portion of cabinet 210.

Cabinet 210 is formed at an upper portion of a front periphery 280 thereof with a first two-stepped groove 340 which surrounds an inlet of freezing chamber 230 and is formed at a lower portion of front periphery 280 thereof with a second two-stepped groove 330 which surrounds an inlet of refrigerating chamber 220. A first coupling member 310 is received in first two-stepped groove 340 and a second coupling member 320 is received in second two-stepped groove 330.

In addition, upper door 250 is formed at a rear periphery portion thereof, which faces freezing chamber 230, with a first recess 252 corresponding to first two-stepped groove 340 and lower door 240 is formed at a rear periphery portion thereof, which faces refrigerating chamber 220, with a second recess 242 corresponding to second two-stepped groove 330.

An upper gasket 270 having a first magnet 272 (shown in FIG. 4) therein is received in first recess 252. Upper gasket 270 is attached to first coupling member 310 when freezing chamber 230 is closed thereby preventing an air from flowing into freezing chamber 230.

In addition, a lower gasket 260 having a second magnet 262 (shown in FIG. 5) therein is received in second recess 242. Lower gasket 260 is attached to second coupling member 320 when refrigerating chamber 220 is closed thereby preventing an air from flowing into refrigerating chamber 220.

Figure 4:
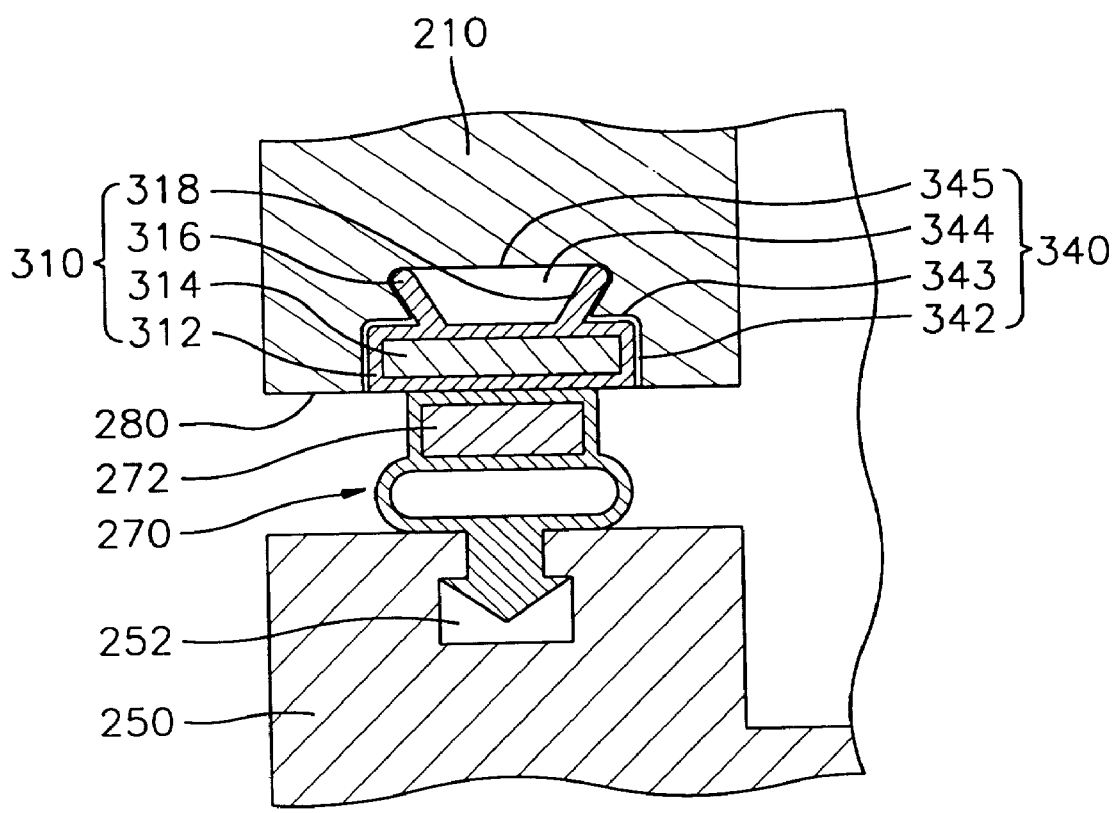
FIG. 4 is a partially sectional plan view showing an upper door attached to a cabinet according to one embodiment of the present invention.

FIG. 4 shows first coupling member 310 accommodated in first two-stepped groove 340. As shown in FIG. 4, first two-stepped groove 340 includes a first groove 342 formed at the front surface of cabinet 210 and a second groove 344 which extends towards an inner portion of cabinet 210 from a bottom 343 of first groove 340. First groove 340 has a rectangular sectional shape and second groove 344 has a reverse frusto-conical shape, respectively, when viewed from top. Second groove 344 has a width smaller than a width of first groove 340 and the width of second groove 344 increases in size as second groove 344 goes towards a bottom portion 345 thereof.

First coupling member 310 includes a rectangular frame 312 having a shape corresponding to first groove 342 so as to be received in first groove 342, a pair of fixing members 316 and 318 which are formed along a periphery of a rear surface of rectangular frame 312 and are accommodated in second groove 344 of first two-stepped groove 340, and a metal piece 314 which is accommodated in rectangular frame 312. Metal piece 314 is attracted by magnets, so that, when freezing chamber 230 is closed, upper gasket 270 having magnet 270 can be attached to first coupling member 310 using metal piece 314.

Preferably, rectangular frame 312, the pair of fixing members 316 and 318 and metal piece 314 are integrally formed by a compression-molding process.

In addition, first coupling member 310 is made of an elastic material, and the pair of fixing members 316 and 318 are inclined opposite to each other. A distance between the pair of fixing members 316 and 318 is larger than a width of an inlet of second groove 344. Accordingly, the pair of fixing members 316 and 318 are elastically inserted into second groove 344 and make contact with side walls of second groove 344 so that first coupling member 310 is fixedly accommodated in first two-stepped groove 340.

Figure 5:
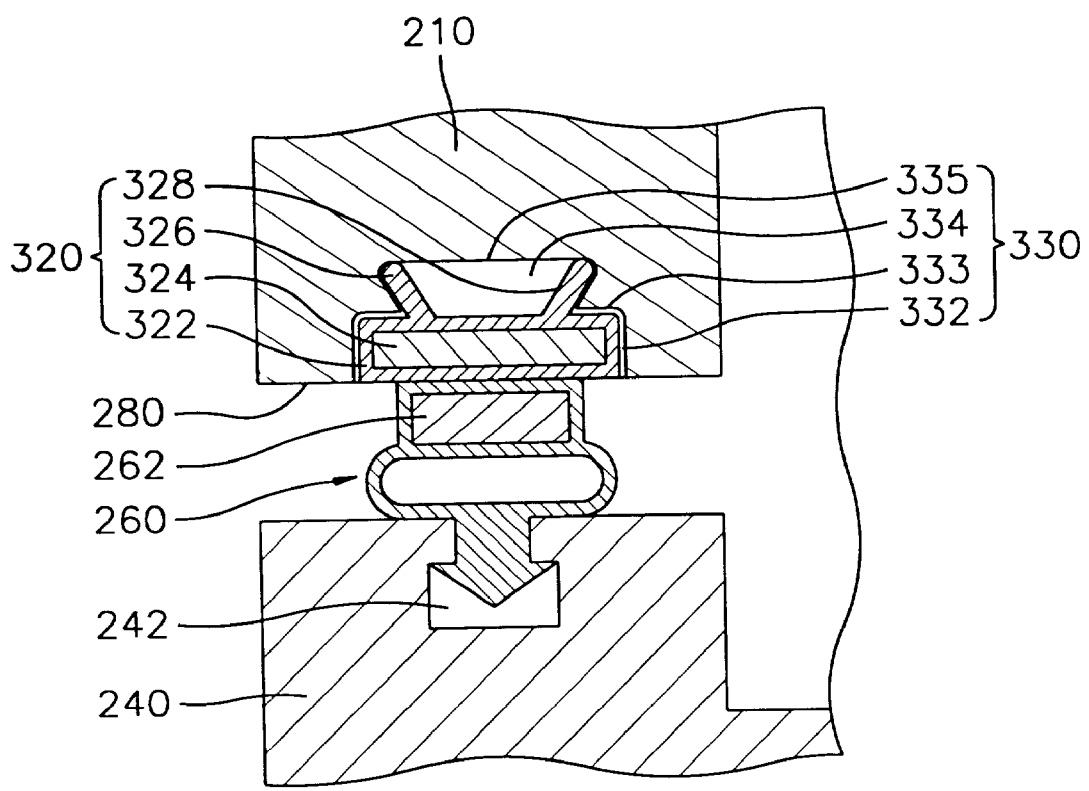
FIG. 5 is a partially sectional plan view showing a lower door attached to a cabinet according to one embodiment of the present invention.

On the other hand, FIG. 5 shows second coupling member 320 accommodated in second two-stepped groove 343. Second coupling member 320 and second two-stepped groove 343 has the structures and shapes identical to the structures and shapes of first coupling member 310 and first two-stepped groove 340.

That is, as shown in FIG. 5, second two-stepped groove 330 includes a third groove 332 formed at the front surface of cabinet 210 and a fourth groove 334 which extends towards an inner portion of cabinet 210 from a bottom 333 of third groove 332. Third groove 332 has a rectangular sectional shape and fourth groove 334 has a reverse frusto-conical shape, respectively, when viewed from a top. Fourth groove 334 has a width smaller than a width of third groove 332 and the width of fourth groove 334 increases in size as fourth groove 334 goes towards a bottom portion 335 thereof.

Second coupling member 320 includes a rectangular frame 322 having a shape corresponding to third groove 332 so as to be received in third groove 332, a pair of fixing members 326 and 328 which are formed along a periphery of a rear surface of rectangular frame 322 and are accommodated in fourth groove 334 of second two-stepped groove 330, and a metal piece 324 which is accommodated in rectangular frame 322. Metal piece 324 is attracted by magnets, so that, when refrigerating chamber 220 is closed, lower gasket 260 having magnet 260 can be attached to second coupling member 320 using metal piece 324.

In addition, second coupling member 320 is made of an elastic material, and the pair of fixing members 326 and 328 are inclined opposite to each other. A distance between the pair of fixing members 326 and 328 is larger than a width of an inlet of fourth groove 334. Accordingly, the pair of fixing members 326 and 328 are elastically inserted into fourth groove 334 and make contact with side walls of fourth groove 334 so that second coupling member 320 is fixedly accommodated in second two-stepped groove 330.

Refrigerator 100 of the present invention having the above construction is manufactured as follows.

Firstly, cabinet 210 is manufactured by the blow-molding process in such a manner that first and second two-stepped grooves 340 and 330 can be formed at the front periphery thereof.

Then, first and second coupling members 310 and 320 manufactured by the compression-molding process are received in first and second two-stepped grooves 340 and 330, respectively. At this time, each pair of fixing members 316, 318, 326, and 328 is elastically inserted into second and fourth grooves 344 and 334, respectively. Accordingly, fixing members 316, 318, 326, and 328 elastically make contact with side walls of second and fourth grooves 344 and 334, so first and second coupling members 310 and 320 can be fixedly accommodated in first and second two-stepped groove 340 and 330, respectively.

Next, upper and lower gaskets 270 and 260 are press-fitted into first and second recesses 252 and 242 formed in upper and lower doors 250 and 240, respectively, and upper and lower doors 250 and 240 are hinged to upper and lower front portions of cabinet 210, respectively.

As a result, when freezing chamber 230 is closed, upper gasket 270 mounted in upper door 250 is attached to first coupling member 310 thereby preventing the air from flowing into freezing chamber 230.

In addition, when refrigerating chamber 220 is closed, lower gasket 260 mounted in lower door 240 is attached to second coupling member 320 thereby preventing the air from flowing into refrigerating chamber 220.

As described above, the refrigerator according to the present invention has a cabinet made of synthetic resin or plastic, so the refrigerator has a simple structure and has a light weight.

In addition, since the cabinet can be manufactured by a blow-molding process, the manufacturing time and the assembling steps for the cabinet can be reduced.

Although the preferred embodiment of the invention has been described, it is understood that the present invention should not be limited to this preferred embodiment, but various changes and modifications can be made by one skilled in the art within the spirit and scope of the invention as hereinafter claimed.

What is claimed is:

1. A refrigerator comprising:

a cabinet manufactured by a blow molding process and having a refrigerating chamber and freezing chamber which is disposed above the refrigerating chamber, the cabinet being formed at an upper front portion thereof with a first two-stepped groove which surrounds an inlet of the freezing chamber and being formed at a lower front portion thereof with a second two-stepped groove which surrounds an inlet of the refrigerating chamber, the first two-stepped groove including a first groove formed at a front surface of the cabinet and a second groove which extends towards an inner portion of the cabinet from a bottom of the first groove and the second two-stepped groove including a third groove formed at the front surface of the cabinet and a fourth groove which extends towards the inner portion of the cabinet from a bottom of the third groove, the first and third grooves having rectangular sectional shapes and the second and fourth grooves having reverse frusto-conical shapes, respectively, when viewed from a top;

an upper door for opening/closing the freezing chamber, the upper door being formed at a rear periphery portion thereof, which faces the freezing chamber, with a first recess corresponding to the first two-stepped groove;

a lower door for opening/closing the refrigerating chamber, the lower door being formed at a rear periphery portion thereof, which faces the refrigerating chamber, with a second recess corresponding to the second two-stepped groove;

an upper gasket received in the first recess and having a first magnet therein;

a lower gasket received in the second recess and having a second magnet therein;

a first means for fixing the upper door to a front surface of the cabinet when the freezing chamber is closed by the upper door, the first means including a first coupling member which is accommodated in the first two-stepped groove, the first coupling member having a first rectangular frame having a shape corresponding to the first groove so as to be received in the first groove, a pair of first fixing members which are formed along a periphery of a rear surface of the first rectangular frame and are accommodated in the second groove of the first two-stepped groove, and a first metal place which is accommodated in the first rectangular frame and is attracted by the first magnet, a distance between the pair of first fixing members being larger than a width of an inlet of the second groove and making contact with side walls of the second groove so that the first coupling member is fixedly accommodated in the first two-stepped groove; and a second means for fixing the lower door to the front surface of the cabinet when the refrigerating chamber is closed by the lower door.

2. The refrigerator as claimed in claim 1, wherein the second groove having a width smaller than a width of the first groove and the width of the second groove grows in size as the second groove goes towards the inner portion of the cabinet.

3. The refrigerator as claimed in claim 1, wherein the rectangular frame, the pair of fixing members and the metal piece are integrally formed by a compression molding process.

4. The refrigerator as claimed in claim 1, wherein the coupling member is made of an elastic material, and the pair of fixing members are inclined opposite to each other.

5. The refrigerator as claimed in claim 1, wherein the second means includes a second coupling member which is accommodated in the second two-stepped groove, the second coupling member comprising a second rectangular frame having a shape corresponding to the third groove so as to be received in the third groove, a pair of second fixing members which are formed along a periphery of a rear surface of the second rectangular frame and are accommodated in the fourth groove of the second two-stepped groove, and a second metal piece which is accommodated in the second rectangular frame and is attracted by the second magnet.

6. The refrigerator as claimed in claim 5, wherein the second coupling member is made of an elastic material, and the pair of second fixing members are inclined in opposite to each other.

7. The refrigerator as claimed in claim 5, wherein a distance between a pair of second fixing members is larger than a width of an inlet of the fourth groove, and the pair of second fixing members are elastically inserted into the fourth groove and make contact with side walls of the fourth groove and make contact with side walls of the fourth groove so that the second coupling member is fixedly accommodated in the second two-stepped groove.

* * * * *